T. ETWELL.
PIPE ORGAN.
APPLICATION FILED JULY 9, 1904. RENEWED JAN. 11, 1909.
930,276.
Patented Aug. 3, 1909.
6 SHEETS—SHEET 5.
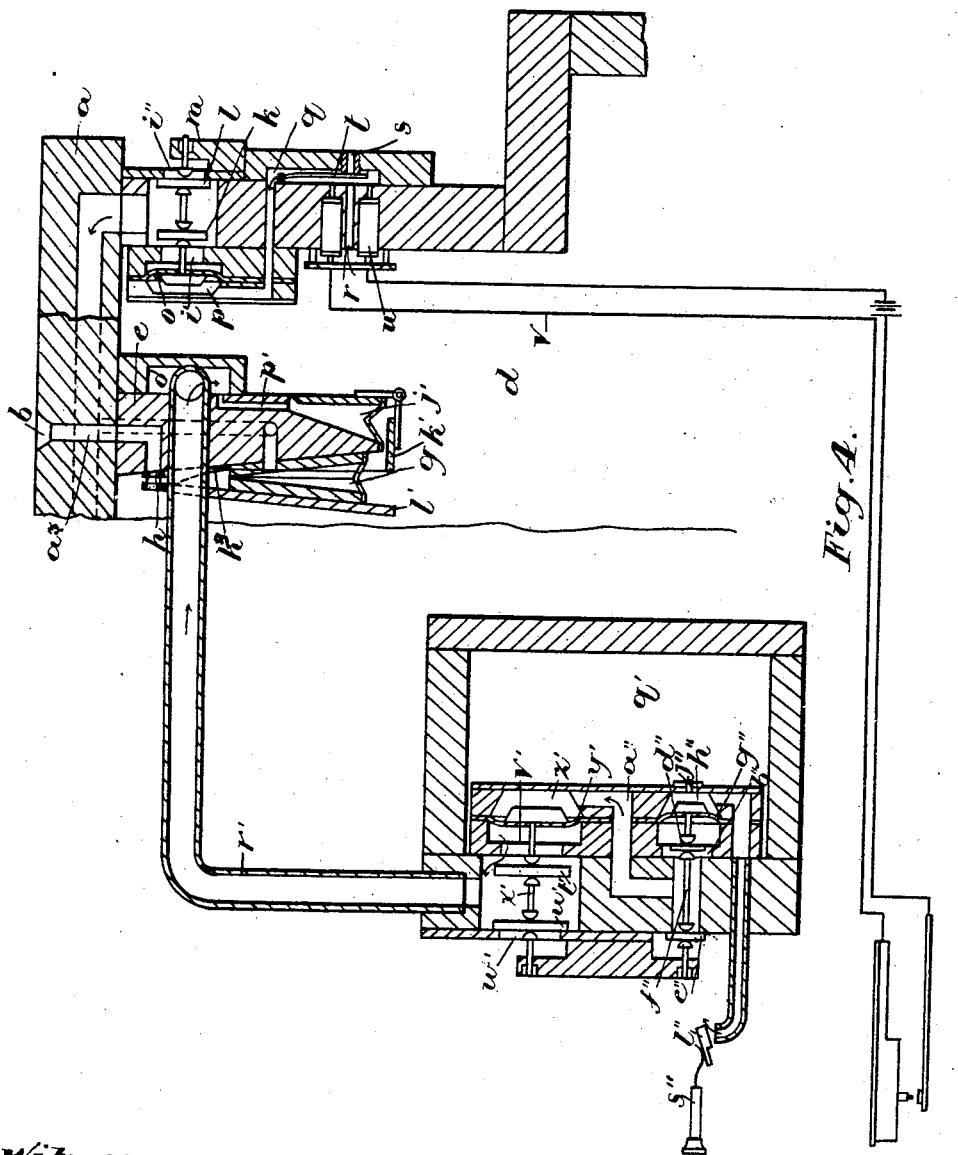
Fig. A.
Witnesses.
Inventor.

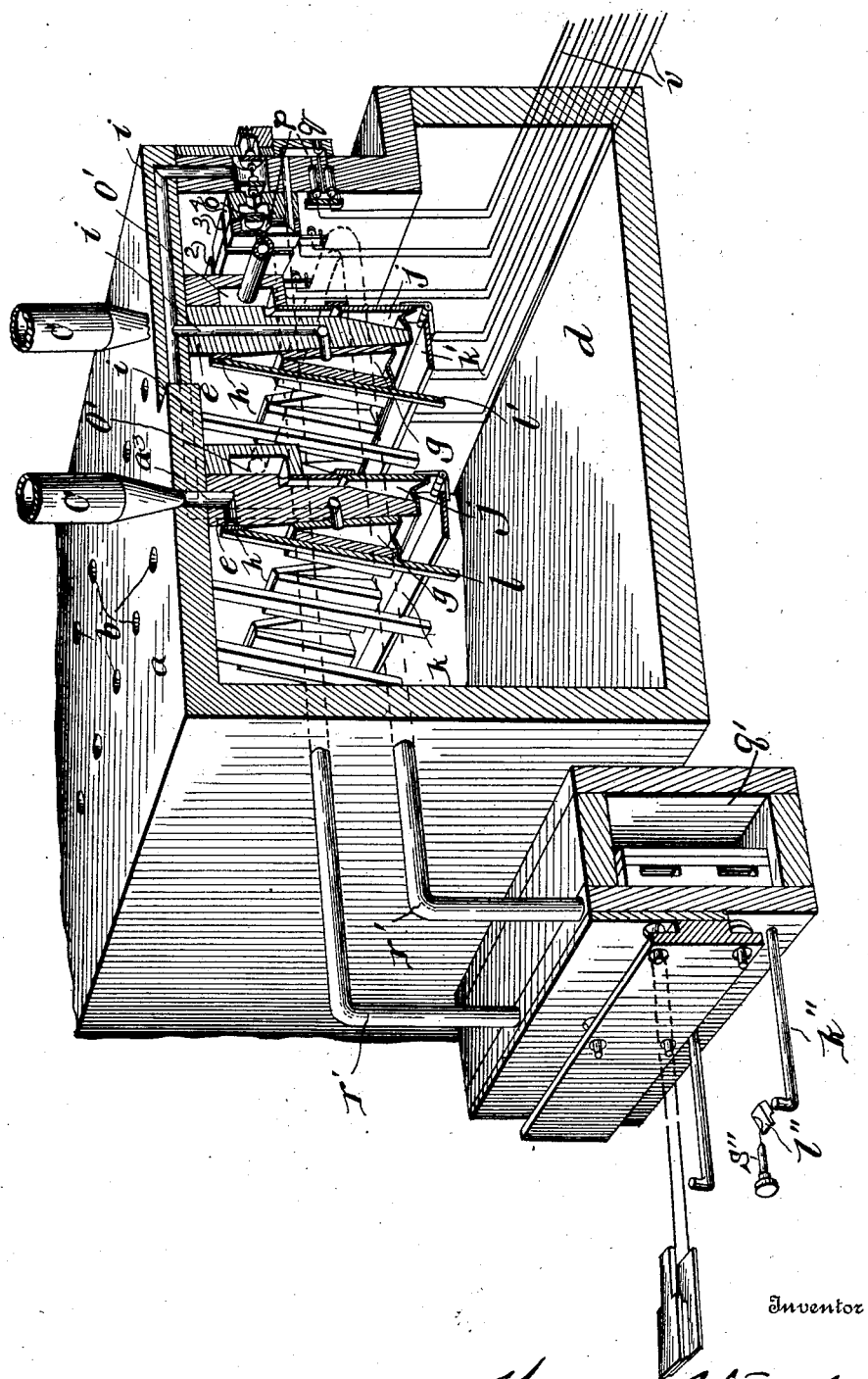

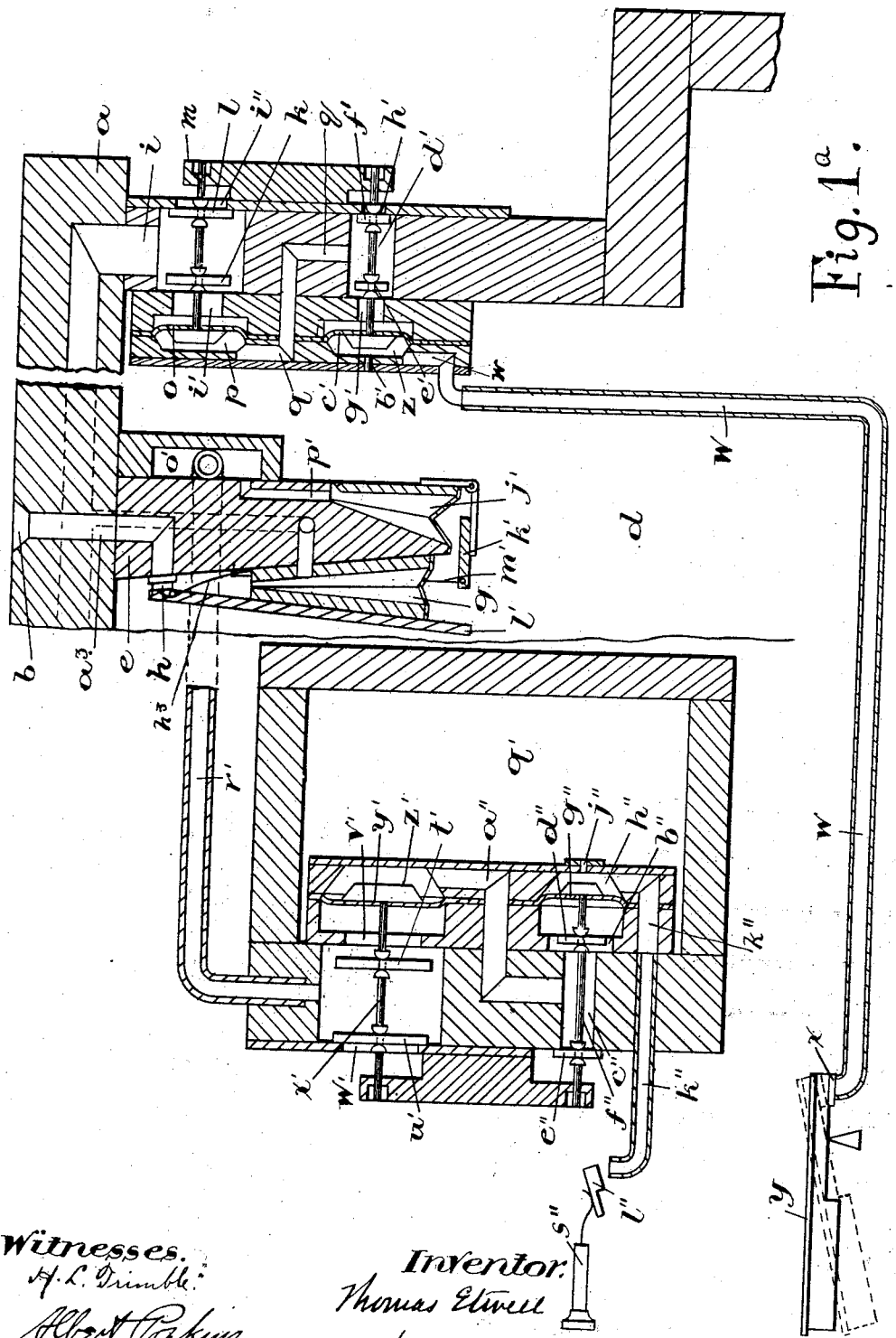

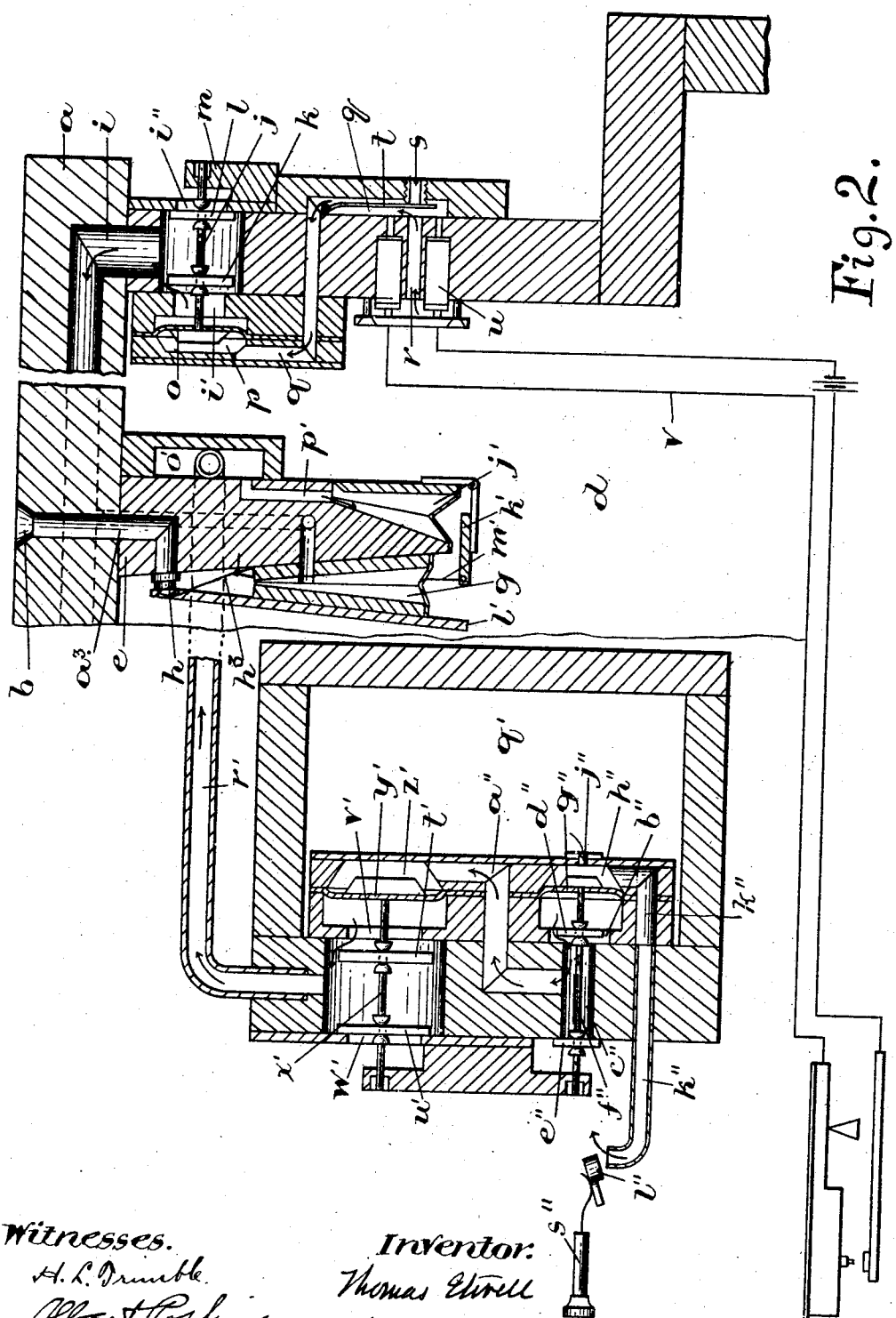

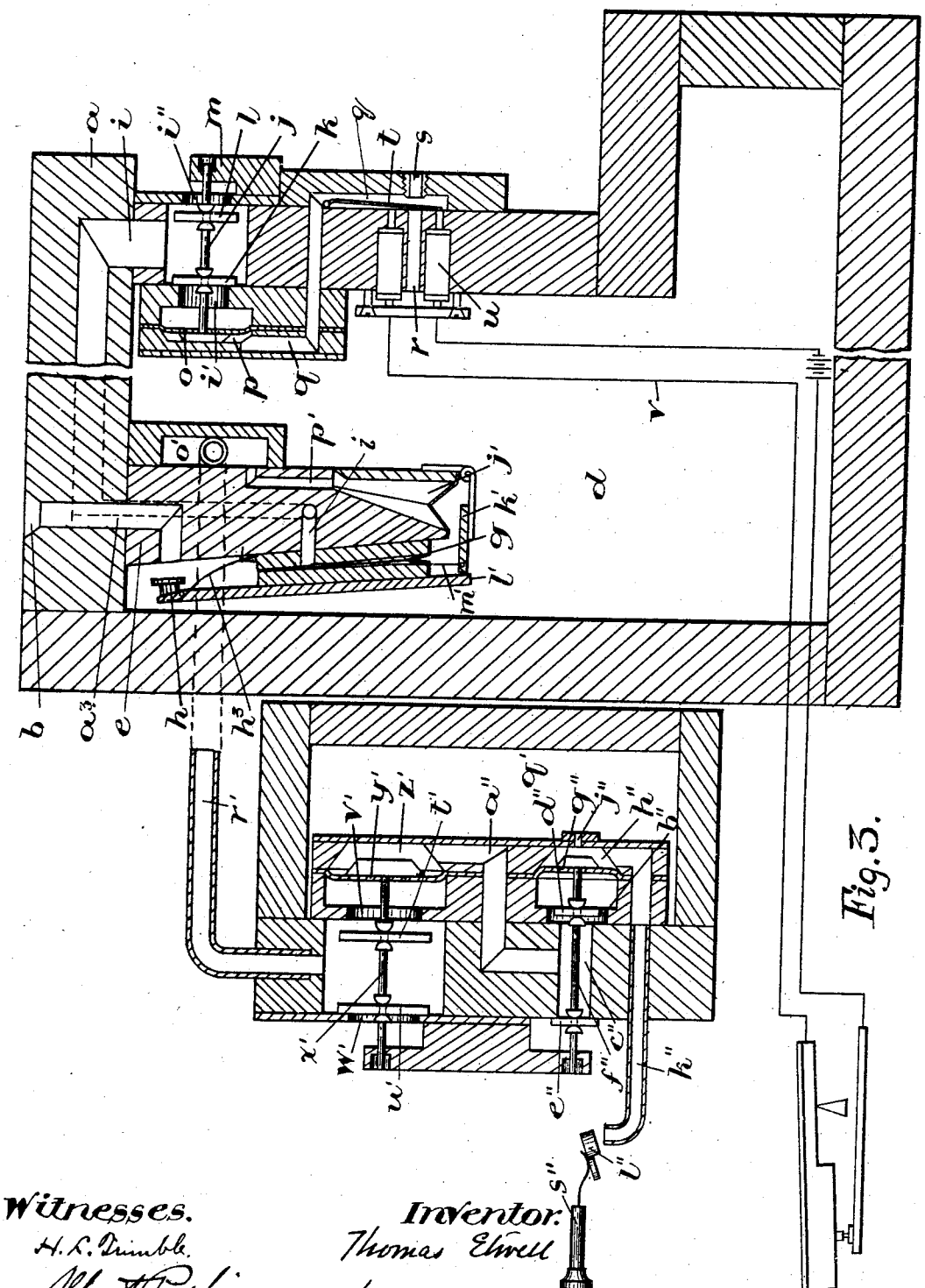

T. ETWELL.
PIPE ORGAN.
APPLICATION FILED JULY 9, 1904. RENEWED JAN. 11, 1909.

930,276.

Patented Aug. 3, 1909.
6 SHEETS—SHEET 6.

Witnesses.

Inventor.
Thomas Etwell

UNITED STATES PATENT OFFICE.

THOMAS ETWELL, OF WOODSTOCK, ONTARIO, CANADA, ASSIGNOR OF ONE-HALF TO FLORELLA BROCK, OF TORONTO, ONTARIO, CANADA.

PIPE-ORGAN.

No. 930,276.     Specification of Letters Patent.     Patented Aug. 3, 1909.

Application filed July 9, 1904, Serial No. 215,843. Renewed January 11, 1909. Serial No. 471,779.

*To all whom it may concern:*

Be it known that I, THOMAS ETWELL, of the city of Woodstock, in the county of Oxford and Province of Ontario, Canada, have invented certain new and useful Improvements in Pipe-Organs; and I hereby declare that the following is a full, clear, and exact description of the same.

This invention relates to a pipe organ comprising in its construction a wind chest having a sound board and a valve supporting rail contained in the wind chest with wind ducts leading to the speaking pipes controlled by valves contained within the wind chest and actuated by the wind pressure therein to respectively open and close said wind ducts during the operation of the organ keys, the object of this feature of the invention being to utilize the wind pressure within the wind chest to actuate the valves so that the wind ducts may be instantaneously opened and closed during the operation of the organ keys to increase the rapidity of the repetition of the notes controlled by the organ keys and render it possible to play any class of music upon the organ in any time ranging from the fastest to the slowest.

The invention further relates to the construction and operation of the stop action for the valves controlling the wind ducts for the organ pipes.

Figure 5:
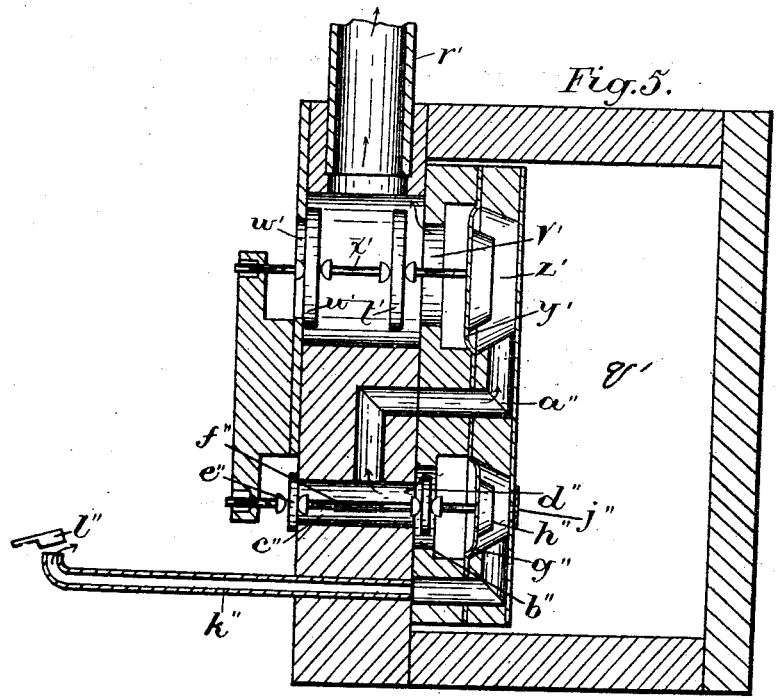
Figure 6:
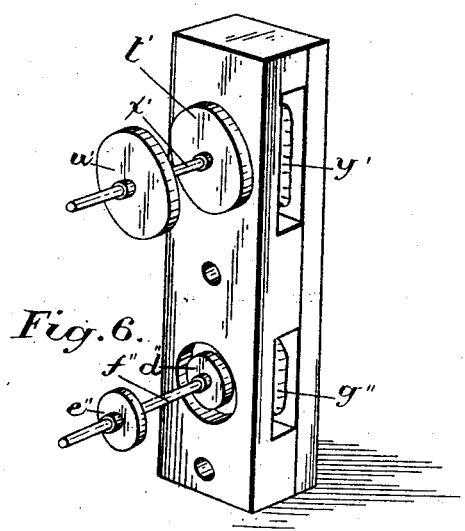

For a full understanding of the invention reference is to be had to the following description and to the accompanying drawings, in which, Figure 1 is a perspective diagrammatic view of the main wind chest, hereinafter frequently referred to as the low pressure wind chest; the supplemental or high pressure wind chest, for controlling the stop action; the pneumatically actuated valves for controlling the flow of wind to the organ pipes; and electrical connections leading to the organ keys through which connections the valve action is controlled; Fig. 1ª is a fragmentary sectional view of the device shown in Fig. 1; the key action being pneumatic instead of electrical, and the parts being shown somewhat enlarged and more in detail; Fig. 2 is a similar view showing electrically controlled means for controlling the flow of wind to the organ pipes; Fig. 3 is a view similar to Fig. 2, but showing the parts in different positions to illustrate the operation of the device; Fig. 4 is a sectional view of the high and low pressure wind chests, showing the stop action for the pipe valves; Fig. 5 is a sectional view of the high pressure wind chest on a larger scale than Fig. 4; Fig. 6 is a perspective view of one set of valves for controlling the passage of the wind from the high pressure wind chest to the stop action bellows.

Like letters of reference refer to like parts throughout the specification and drawings.

In the sound-board $a$ of the low pressure wind chest $d$ are the usual pipe seats $b$ arranged in ranks or rows for the feet of the organ pipes $c$, and within the wind chest $d$ below each rank of pipe seats $b$ is a valve supporting rail $e$ having therein wind ducts $a^3$ leading to the organ pipes $c$, and having secured thereto the pneumatic bellows $g$ for the pipe valves $h$. The pipe valves $h$ engage the valve seats around inlets of the wind ducts $a^3$ to control the flow of wind from the wind chest $d$ to the wind ducts $a^3$ and organ pipes $c$. This valve $h$ is shown conventionally in Fig. 1, and more in detail in other figures. In the valve supporting rail $e$ and sound-board $a$ are ducts $i$ for the pneumatic bellows $g$ of the pipe valves having inlet ports $i'$ formed in a series of separate blocks 2, 3, 4, etc., secured to the wall of the wind chest and communicating with the interior thereof through openings formed in the sides of said blocks. See Figs. 1, 1ª, 2 and 3. Said ducts $i$ also have outlet ports $i''$ communicating with the atmosphere. Duplex valves $k$ and $l$ are mounted upon longitudinally movable valve stems $j$ to alternately engage the seats surrounding the inlet ports $i'$ and outlet ports $i''$ respectively, during the longitudinal movements of the valve stems $j$.

The outer ends of the valve stems $j$ are supported by bearings $m$ connected to the outer side of the wind chest $d$ and the inner ends of the valve stems are connected to the diaphragms $o$ of the pneumatic motors $p$ located within the wind chest and preferably opposed to the inlet ports $i'$. Contained within a casing are ducts $q$ leading from the wind chest to the pneumatic motors $p$ having inlet ports $r$ through which the wind enters from the wind chest $d$ and outlet ports $s$ through which the wind may escape to the atmosphere. Contained within the ducts $q$ are armature valves $t$ Figs. 2, 3 and 4 arranged to alternately engage the valve seats surrounding the inlet ports $r$ and outlet ports $s$, respectively, during the operation of the organ keys.

As shown in Figs. 2 and 3 of the drawings, the armature valves $t$ are actuated by electromagnets $u$ connected with the organ key board by circuit wires $v$. The operation of an organ key completes the electric circuit through its respective electromagnet $u$ which when energized attracts its armature valve $t$ to close the inlet port $r$ and simultaneously open the outlet port $s$ to allow of the escape of the air from within the pneumatic motor $p$ through the duct $q$ to the atmosphere. The motor diaphragm $o$ then collapses by the wind pressure against it and actuates the valve stem $j$ to close the valve $k$ against the valve seat surrounding the inlet port $i'$ and simultaneously remove the valve $l$ from the valve seat surrounding the outlet port $i''$, thus closing the inlet port from the wind chest to the duct $i$ and opening the outlet port from the duct $i$ to the atmosphere so that the wind pressure within the wind chest will collapse the pneumatic bellows $g$ and remove the pipe valve $h$ from its seat $f$ to open the wind passage from the wind chest to the organ pipe, the action of the pipe valve $h$ owing to this construction being coincident with the operation of the organ key and the energizing of the electromagnet $u$. When the circuit of the current through the electromagnet is broken the armature valve $t$ is removed from its seat surrounding the inlet port $r$ and closed against its seat surrounding the outlet port $s$ by the pressure of the wind in the wind chest $d$, so that the wind may flow from the wind chest $d$ through the duct $q$ to again inflate the diaphragm $o$ of the pneumatic motor $p$ and cause the valve stem $j$ to move longitudinally and close the valve $l$ against the valve seat surrounding the outlet port $i''$ and remove the valve $k$ from the valve seat surrounding the inlet port $i'$ so that the wind may flow through the duct $i$ and inflate the pneumatic bellows $g$ of the operated pipe valve $h$ and close said pipe valve against its seat surrounding the inlet port of the wind duct leading to the sounded pipe, the closing movement of the pipe valve $h$ being accelerated by a spring $h^3$. The closing movement of the pipe valve is thus practically instantaneous and coincident with the opening of the electric circuit through the electromagnet.

In Fig. 1ª is shown a duplex valve to control the inlet and outlet ports for the duct $q$ operated by a pneumatic motor $z$ having an outlet duct $w$ fitted with a pivoted valve $x$ actuated by the organ key $y$. Leading from the wind chest $d$ to the pneumatic motor $z$ is a comparatively diminutive hole or bleed $b'$ through which the wind can enter the pneumatic motor from the wind chest to inflate it and distend its diaphragm $c'$ and actuate the longitudinally movable valve stem $d'$ of the duplex valves $e'$ and $f'$ and cause the valve $f'$ to engage the valve seat surrounding the outlet port $h'$ and remove the valve $e'$ from its seat surrounding the inlet port $g'$ so that the wind may pass through the duct $q$ to the pneumatic motor $p$ and inflate it to actuate the duplex valves controlling the air passage $i$ leading to the pneumatic bellows of the pipe valve $h$. The volume of wind entering through the bleed $b'$ to the pneumatic motor $z$ is less than the volume of wind which can escape through the outlet duct $w$, when opened, so that when the valve $x$ is opened by the operation of the organ key $y$ the wind in the pneumatic motor $z$ will escape and permit the pressure of the air in the wind chest to collapse the diaphragm $c'$. This movement of the diaphragm will move the valve stem $d'$ to the left and bring the valve $e'$ into engagement with the valve seat surrounding the inlet port $g'$, at the same time removing the valve $f'$ from its seat surrounding the outlet port $h'$. The supply of air from the wind chest to the air passage $q$ will thus be cut off, and a passage opened from said passage $q$ to the atmosphere; whereupon the pressure in the wind chest will collapse the diaphragm $o$ and actuate the duplex valves $k$ and $l$ as previously described. When the pivoted valve $x$ is closed the wind from the wind chest $d$ will enter the pneumatic motor $z$ through the diminutive opening or bleed $b'$ and refill the motor, thus distending the diaphragm $c'$ and moving the duplex valves $e'$ and $f'$ to the right, thereby opening the inlet port $g'$ and closing the outlet port $h'$. The wind from the wind chest will then refill the pneumatic motor $p$ and actuate the duplex valves $k$ and $l$ to open the inlet port $i'$ and close the outlet port $i''$, so that the wind from the wind chest can pass into the pneumatic bellows $g$ of the pipe valve and inflate it, thereby closing the wind duct $a^3$ leading to the organ pipe.

Connected to the valve supporting rail $e$ on the opposite side to the pipe valves $h$ is a stop action pneumatic bellows $j'$ and hinged to the stop action pneumatic bellows $j'$ is a pipe valve stop $k'$ to engage the projection $l'$, of the pipe valve when the stop action pneumatic bellows is disinflated, the free end of the valve stop $k'$ being suspended by a cord $m'$ from the valve supporting rail $e$ as shown in Figs. 1ª, 2 and 3. Extending along each valve supporting rail $e$ is a supply duct $o'$ with which are connected the air ducts $p'$ leading to the stop action pneumatic bellows $j'$ one for each bellows, the supply ducts $o'$ being connected to the high pressure wind chest $q'$ by wind ducts $r'$, see Figs. 1ª, 2 and 3. The high pressure wind ducts $r'$ correspond in number with the number of organ stops $s''$ and the passage of the wind from the high pressure wind chest $q'$ through each duct $r'$ is controlled by duplex valves $t'$ and $u'$ engaging the seats surrounding the inlet port $v'$ and outlet port $w'$ respectively. The duplex valves $t'$ and $u'$ are mounted on a longitudinally movable valve stem $x'$ actuated by the diaphragm $y'$ of the pneumatic motor $z'$ located within the high pressure wind chest and preferably opposed to the inlet port $v'$. Leading from the high pressure wind chest to the pneumatic motor $z'$ is a wind duct $a''$ having an inlet port $b''$ and an outlet port $c''$ controlled by duplex valves $d''$ and $e''$ respectively mounted upon a longitudinally movable valve stem $f''$ connected to the diaphragm $g''$ of the pneumatic motor $h''$.

Leading from the high pressure wind chest $q'$ to the pneumatic motor $h$ is a diminutive port $j''$ through which the pneumatic motor $h''$ is supplied with wind from the high pressure wind chest $q'$ and connected with the pneumatic motor $h''$ is an exhaust duct $k''$ controlled by a pivoted valve $l''$ opened and closed by the action of the organ stop $s''$. When the pivoted valve $l''$ is positioned to close the exhaust duct $k''$ the air bleeds into the pneumatic motor $h''$ through the diminutive port $j''$ and filling the motor, distends the same to actuate the valve stem $f''$ and move the duplex valves $d''$ and $e''$ to respectively close the inlet port $b''$ and open the outlet port $c''$. This action of the duplex valves $d''$ and $e''$ cuts off the supply of wind from the high pressure wind chest to the pneumatic motor $z'$ through the wind duct $a''$ and permits the wind in the high pressure wind chest to collapse the diaphragm $y'$ and actuate the valve stem $x'$ to move the duplex valves $t'$ and $u'$ to respectively close the inlet port $v'$ and open the outlet port $w'$ so that the wind in the low pressure wind chest $d$ may collapse the stop action bellows and move the valve stop $k'$ into engagement with the extension $l'$ of the pipe valve.

When the organ stop $s''$ is operated to open the valve $l''$ the wind in the pneumatic motor $h''$ exhausts through the duct $k''$ and permits the air in the high pressure wind chest $q'$ to collapse the diaphragm $g''$ and actuate the valve stem $f''$ to move the duplex valves $d''$ and $e''$ to respectively open the inlet port $b''$ and close the outlet port $c''$. This permits the wind to pass from the high pressure wind chest through the wind duct $a''$ to the pneumatic motor $z'$ and inflate it to actuate the duplex valves $t'$ and $u'$ to open the inlet port $v'$ and close the outlet port $w'$. When the inlet port $v'$ is open the wind can pass from the high pressure wind chest through the wind duct $r'$ to the stop action bellows $j'$ and inflate them to move the valve stop $k'$ out of contact with the extensions $l'$ of the pipe valves.

When the valve stop $k'$ is in contact with the pipe valves no operation of the pipe valves can occur, but when the stop action bellows are refilled and the valve stop is out of contact with the pipe valves they can open and close during the operation of their respective organ keys. The pressure of the wind in the low pressure wind chest $d$ is constant and in order that the stop action bellows can counter-act the resistance of the low pressure wind chest, it is necessary to supply the stop action bellows with wind from the high pressure wind chest, the wind pressure in which must exceed the wind pressure in the low pressure wind chest to insure a practically instantaneous operation of the valve stop. Each stop action bellows $j'$ extends along the whole row or rank of its corresponding pipe valves in order that all of the pipes in the rank or row can be placed out of action by the operation of the stop controlling the passage of the wind from the high pressure wind chest to their stop action bellows.

As the general parts of the organ other than the valves for controlling the passage of the air to the organ pipes, and for placing the pneumatic valves in and out of action are the same as those of pipe organs in general, it has not been necessary to describe any of the parts other than those relating to the present invention.

Having thus described my invention what I claim as new and desire to secure by Letters Patent is:—

1. In a pipe organ, the combination with the organ keys speaking pipes and sound board, of a wind chest communicating with said pipes through the sound-board thereof, rails secured to the underside of the sound-board, valves to control the admission of wind from the wind chest to said pipes, pneumatic bellows carried by said rails and operable by the wind pressure in the wind chest to actuate said valves, wind ducts in the sound-board and passages in said rails connecting said ducts to said bellows, duplex admission and exhaust valves in said ducts, pneumatic motors in said wind chest operable by the wind pressure therein to actuate said duplex valves, a second series of duplex admission and exhaust valves to control the operation of said pneumatic motors, a second series of pneumatic motors also in said wind chest and operable by the pressure therein to actuate said last mentioned duplex valves, diminutive passages to admit the air to said last mentioned pneumatic motors, and valves operable by the organ keys to exhaust the wind in said last mentioned motors.

2. In a pipe organ, the combination with organ keys a row of speaking pipes and a sound board therefor, of a wind chest communicating with said pipes through the sound-board thereof, a rail secured to the underside of the sound-board, a series of valves to control the admission of the wind to said pipes, a series of pneumatic bellows carried by said rail and operable by the wind pressure in said chest to actuate said valves, means controlled by the organ keys to control the operation of said bellows, a stop action pneumatic bellows also carried by said rail and provided with a stop adapted, when said stop action pneumatic bellows is collapsed, to engage and prevent the collapse of said series of pneumatic bellows, a high pressure wind chest communicating with said stop action pneumatic bellows, a duplex valve in said high pressure wind chest to control the admission to and exhaust from said stop action pneumatic bellows, a pneumatic motor operable by the wind pressure in said high pressure wind chest to actuate said duplex valve, a second duplex valve operable by the wind pressure in said chest to control the admission to and exhaust from said pneumatic motor and means operable by an organ stop to control the actuation of said second duplex valve.

3. In a pipe organ, the combination with the organ keys a row of speaking pipes and a sound board therefor, of a wind chest communicating with said pipes through the sound-board thereof, a rail secured to the underside of the sound-board, a series of valves to control the admission of the wind to said pipes, a series of pneumatic bellows carried by said rail and operable by the wind pressure in said chest to actuate said valves, means controlled by the organ keys to control the operation of said bellows, a stop action pneumatic bellows also carried by said rail and provided with a stop adapted, when said stop action pneumatic bellows is collapsed, to engage and prevent the collapse of said series of pneumatic bellows, a high pressure wind chest communicating with said stop action pneumatic bellows, a duplex valve in said high pressure wind chest to control the admission to and exhaust from said stop action pneumatic bellows, a pneumatic motor operable by the wind pressure in said high pressure wind chest to actuate said duplex valve, a second duplex valve operable by the wind pressure in said chest to control the admission to and exhaust from said pneumatic motor, a second pneumatic motor to actuate said second valve, a diminutive passage to admit pressure from said high pressure wind chest to said second pneumatic motor, and a valve operable by an organ stop to exhaust the pressure from said second pneumatic motor.

4. A pipe organ comprising a set of organ keys, a wind chest, a sound-board therefor, organ pipes communicating with the wind chest through the sound-board, valves to control the admission of wind from the wind chest to the organ pipes, pneumatic bellows within the wind chest operable by the wind therein to actuate said valves, wind ducts leading from the pneumatic bellows and having inlet and outlet ports communicating respectively with the wind chest and atmosphere, valves controlling said ports, means within the wind chest operable by the wind therein to actuate said last mentioned valves, and other means actuated by the organ keys to control said valve actuating means.

5. A pipe organ comprising a set of organ keys, a wind chest, a sound-board therefor, organ pipes communicating with the wind chest through the sound-board, valves to control the admission of wind from the wind chest to the organ pipes, pneumatic bellows within the wind chest operable by the wind therein to actuate said valves, wind ducts communicating with the pneumatic bellows and having inlet and outlet ports communicating respectively with the wind chest and atmosphere, valves controlling said ports, pneumatic motors within the wind chest and operable by the wind therein to actuate the valves, and means actuated by the organ keys to control said motors.

6. In a pipe organ, the combination with the organ keys, speaking pipes, and sound-board of a wind chest communicating with said pipes through the sound-board thereof, valves to control the admission of wind from the wind chest to said pipes, pneumatic bellows operable by the wind pressure in the wind chest to actuate said valves, wind ducts connected with said bellows, duplex admission and exhaust valves in said ducts, pneumatic motors in said wind chest operable by the wind pressure therein to actuate said duplex valves, a second series of duplex admission and exhaust valves to control the operation of said pneumatic motors, a second series of pneumatic motors also in said wind chest and operable by the pressure therein to actuate said last mentioned duplex valves, diminutive passages to admit the air to said last mentioned pneumatic motors, and valves operable by the organ keys to exhaust the wind in said last mentioned motors.

7. A pipe organ comprising a wind chest, a sound-board therefor, organ pipes communicating with the wind chest through the sound-board, valves to control the admission of wind from the wind chest to the organ pipes, pneumatic motors within the wind chest and operable by the wind therein to actuate said valves, wind ducts connected with the pneumatic motors, and having inlet and outlet ports communicating respectively with the wind chest and atmosphere, valves controlling said ports, and other pneumatic motors within the wind chest and operable by the wind therein to actuate said last mentioned valves, and organ keys to control the action of said last mentioned motors.

8. A pipe organ comprising a wind chest having a sound board with pipe seats therein, a valve supporting rail arranged within the wind chest and having formed therein wind ducts communicating with said pipe seats and with the interior of the wind chest, pneumatic valves supported by the valve supporting rail to control the wind ducts, the valve supporting rail also having formed therein air passages leading from the bellows of the pneumatic valves, said air passages communicating with passages leading to the wind chest and to the atmosphere, and means controlled by the organ keys to selectively open and close said air passages to the wind chest or atmosphere.

9. A pipe organ comprising a wind chest, a sound board therefor, organ pipes communicating with the wind chest through passages extending through the sound board from the wind chest to the organ pipes, valves located within the wind chest and controlling the passage of the wind to the organ pipes, pneumatic motors within the wind chest and operable by the wind therein to actuate said valves, wind ducts extending to the pneumatic motors and having inlets into the wind chest and outlets to the atmosphere, said outlets being located contiguous to the wind chest, other pneumatic motors and valves for controlling the inlets and outlets of the wind ducts, and key actuated means to control the operation of said last mentioned pneumatic motors and valves.

Woodstock, July 4th, 1904.

THOMAS ETWELL.

Signed in the presence of—
C. H. RICHES.
T. G. WALLACE.